(12) United States Patent
Vaidyanathan

(10) Patent No.: US 8,195,299 B2
(45) Date of Patent: Jun. 5, 2012

(54) METHOD AND APPARATUS FOR DETECTING THE CORONAL SUTURE FOR STEREOTACTIC PROCEDURES

(75) Inventor: Janardan Vaidyanathan, Thane (IN)

(73) Assignee: Medtronic, Minneapolis, MN (US)

( * ) Notice: Subject to any disclaimer, the term of this patent is extended or adjusted under 35 U.S.C. 154(b) by 475 days.

(21) Appl. No.: 12/431,113

(22) Filed: Apr. 28, 2009

(65) Prior Publication Data
US 2010/0274311 A1 Oct. 28, 2010

(51) Int. Cl.
*A61N 1/00* (2006.01)
(52) U.S. Cl. .......................................... 607/45
(58) Field of Classification Search ............... 607/45
See application file for complete search history.

(56) References Cited

U.S. PATENT DOCUMENTS

| | | | |
|---|---|---|---|
| 6,258,103 B1 | 7/2001 | Saracione | |
| 6,482,182 B1 | 11/2002 | Carroll et al. | |
| 6,493,573 B1 | 12/2002 | Martinelli et al. | |
| 6,516,212 B1 | 2/2003 | Bladen et al. | |
| 2003/0114752 A1 | 6/2003 | Henderson et al. | |
| 2005/0049486 A1 | 3/2005 | Urquhart et al. | |
| 2005/0085714 A1 | 4/2005 | Foley et al. | |
| 2005/0085720 A1 | 4/2005 | Jascob et al. | |
| 2008/0081982 A1 | 4/2008 | Simon et al. | |
| 2009/0028403 A1* | 1/2009 | Bar-Aviv et al. ............... | 382/128 |

OTHER PUBLICATIONS

International Search Report and Written Opinion mailed Apr. 26, 2010 claiming benefit to U.S. Appl. No. 12/431,113, filed Apr. 28, 2009.

"2. Surface Markings of Special Regions of the Head and Neck," Human Body XII. Surface Anatomy and Surface Markings, Surface Markings of Special Regions of the Head and Neck, ! Human Anatomy, http://www.theodora.com/anatomy/surface_markings_of_special_regions_of_the_head_and_neck.html (10 pages) (printed Sep. 21, 2009).
Cotton, François, et al., "Cranial sutures and craniometric points detected on MRI", Radiologic Anatomy, Surg Radiol Anat (2005) 27:64-70.
Desvignes, M., et al. "First Steps toward Automatic Location of Landmarks on X-Ray Images", 2000 pp. 275-278.
Park, Michael C., et al., "Neuroanatomical Localization of the 'Precentral Knob' with Computed Tomography Imaging", Stereotactic and Functional Neurosurgery, 2007; 85:158-161 http://content.karger.com/ProdukteDB/produkte.asp?Aktion=ShowPDF&ArtikelNr=99074&ProduktNr=224132&Ausgabe=232827&filename=99074.pdf (printed Sep. 21, 2009).
Vérard, Laurent et al., "Fully Automatic Identification of AC and PC Landmarks on Brain MRI Using Scene Analysis", Transactions on Medical Imaging, vol. 16, No. 5, Oct. 1997.

* cited by examiner

*Primary Examiner* — Eric D. Bertram
(74) *Attorney, Agent, or Firm* — Scott A. Marks; Harness Dickey & Pierce, PLC

(57) ABSTRACT

A method for identifying a coronal suture on a cranium can include acquiring image data of craniums for a plurality of patients. A database can be created that includes spatial relationships of various craniometric landmarks of the plurality of patients sorted by a desired population characteristic. A region of interest can be established that is based on a variance of locations of the craniometric landmarks between the plurality of patients for the desired characteristic. A criteria search can be performed of acquired image data from a specific patient that is limited to only the region of interest to identify a coronal suture for that specific patient.

21 Claims, 4 Drawing Sheets

METHOD AND APPARATUS FOR DETECTING THE CORONAL SUTURE FOR STEREOTACTIC PROCEDURES

FIELD

The present disclosure relates to landmark identification on a cranium and more particularly to a method and apparatus for detecting a location of a coronal suture.

BACKGROUND

This section provides background information related to the present disclosure which is not necessarily prior art.

In a human cranium, the eight cranial bones, which together form a hollow protective brain case or cranium are the occipital, sphenoid, ethmoid and frontal bones, as well as the paired temporal and parietal bones. Cranium articulations are generally serrated sutures, such as the sagittal suture and the coronal suture. The coronal suture joins the frontal bones with the parietal bones. The parietal bones are attached to each other in the median plane on top of the cranium by the sagittal suture, which runs from the bregma to the lambdoid suture.

In some examples, it may be necessary to identify the location of the coronal suture. The coronal suture can be used as a landmark in performing various surgeries, such as deep brain stimulation surgery or others wherein an entry point or multiple entry points are preferred slightly anterior to the coronal suture or on the coronal suture.

SUMMARY

This section provides a general summary of the disclosure, and is not a comprehensive disclosure of its full scope or all of its features.

A method for identifying a coronal suture on a cranium can include acquiring image data of craniums for a plurality of patients. A database can be created that includes spatial relationships of various craniometric landmarks of the plurality of patients sorted by a desired population characteristic. A region of interest can be established that is based on a variance of locations of the craniometric landmarks between the plurality of patients for the desired characteristic. A criteria search can be performed of acquired image data from a specific patient that is limited to only the region of interest to identify a coronal suture for that specific patient.

According to additional features, creating the database can include creating a data set for each patient of the plurality of patients. Creating the data set for each patient can include, identifying a glabella and inion on the cranium. A midpoint between the glabella and the inion can be defined. A bregma can be identified. A first vector from the midpoint to the bregma of the cranium can be defined. A plurality of vectors from the midpoint to the coronal suture can be defined between a right and a left extremity of the coronal suture.

The desired population characteristic can be selected from any desired characteristic including, but not limited to, ethnicity, age and sex. The identification of at least one of the glabella, inion and bregma can be determined based on analysis of a plurality of sagittal images. The sagittal images can be truly acquired or reconstructed from one of volumetric, axial, coronal or other image sequences. Performing the criteria search can include identifying an absence of an MR signal on the acquired image data. In one example, performing the criteria search can include conducting advanced scene analysis.

A related system for identifying a coronal suture on a cranium can include an imaging device that acquires craniometric image data. A database can establish spatial relationships of various craniometric landmarks for a plurality of patients that is based on the image data and sorted by a population characteristic. A first processor can establish a region of interest based on a variance of locations of the craniometric landmarks between the plurality of patients for the desired characteristic. A second processor can perform a criteria search of acquired image data for a specific patient that is limited to only the region of interest to identify a coronal suture for that specific patient.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
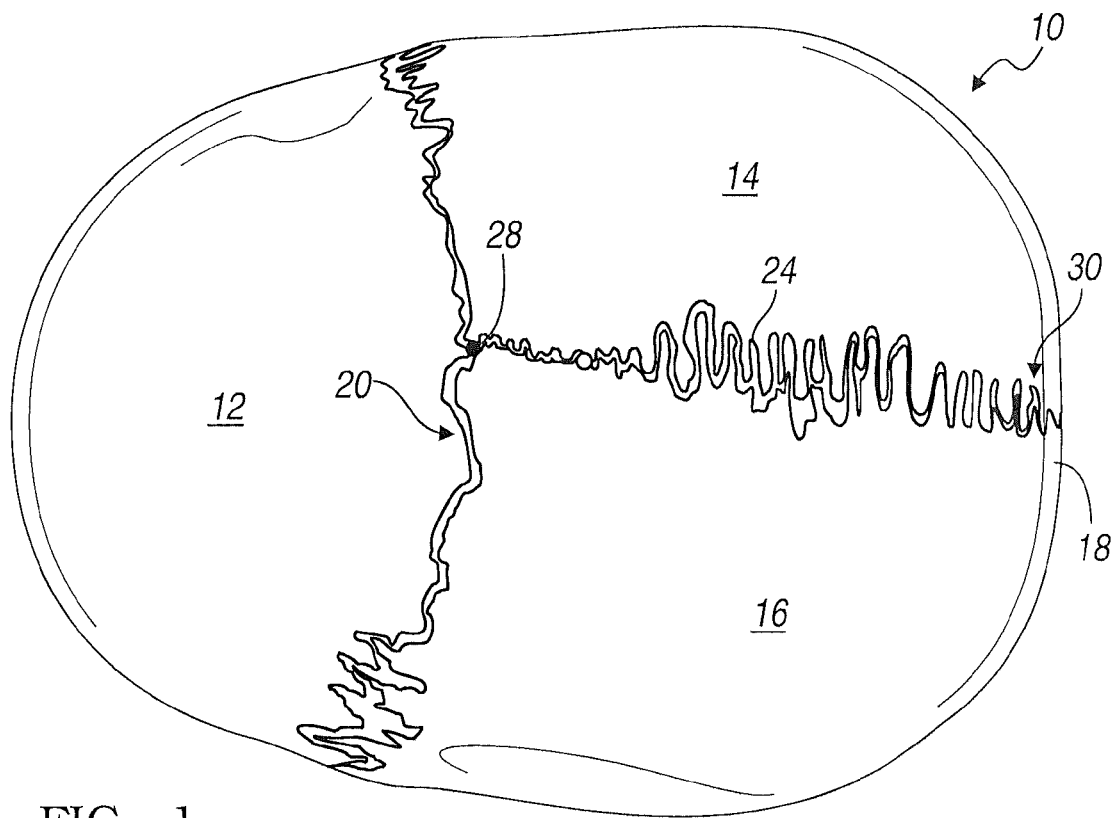
FIG. 1 is a superior view of a human cranium.

The following description is merely exemplary in nature and is not intended to limit the present disclosure, application or uses. Initially, one skilled in the art will understand that the system and apparatus disclosed herein can be used in any appropriate procedure where identification of anatomical landmarks of the cranium, such as a coronal suture is desired.

Prior to describing the system and method according to the present teachings, a general discussion of a cranium will be described. With initial reference to FIGS. 1 and 2, a cranium 10 is shown. The cranium 10 includes a frontal bone 12, a pair of parietal bones 14, 16, and an occipital bone 18. It is appreciated that the cranium 10 includes other bones that are not specifically identified in FIGS. 1 and 2. A coronal suture 20 joins the frontal bone 12 with the parietal bones 14 and 16. The parietal bones 14 and 16 are attached to each other in the median plane on top of the cranium 10 by a sagittal suture 24. The sagittal suture 24 extends from a bregma 28 to a lambdoid suture 30. A glabella 32 is the most prominent point in the midline sagittal plane anteriorly between the supraorbital ridges (not specifically identified). An inion 34 is the most prominent point in the midline sagittal plane posteriorly in the center of the superior nachal line of the occipital bone 18. The bregma 28 can also define the junction of the sagittal suture 24 and the coronal suture 20 at the top of the cranium 10.

Figure 3:
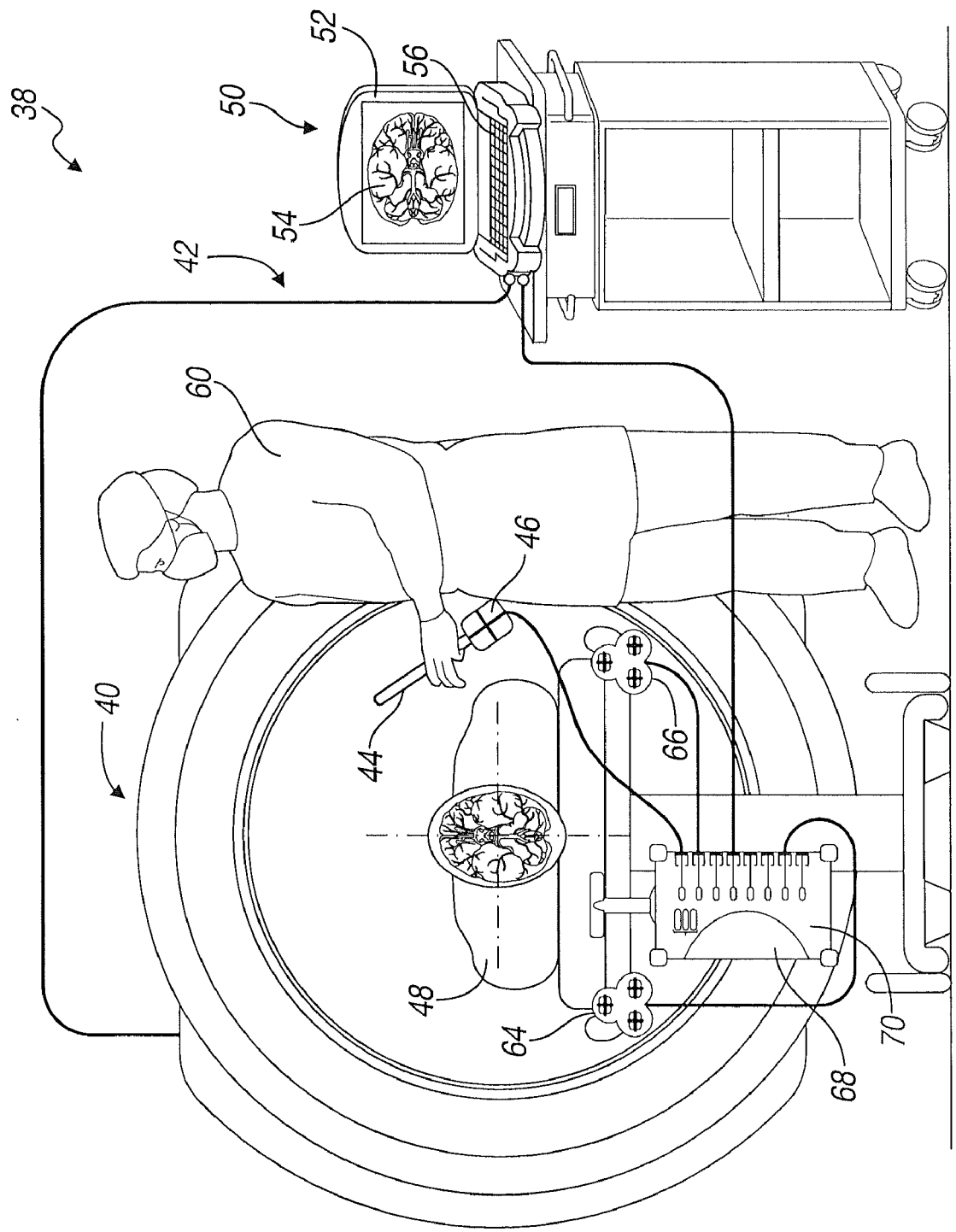
FIG. 3 is an environmental view of a patient shown during an MRI procedure and illustrated with optional surgical navigation equipment.

With reference now to FIG. 3, an exemplary system for detecting a coronal suture for surgical procedures, such as stereotactic procedures, according to one example of the present teachings is shown and generally identified at reference numeral 38. The system 38 can generally include an imaging device 40, such as a magnetic resonance imaging (MRI) device. The system 38 can also be optionally used in conjunction with a surgical navigation system 42. Further details of one exemplary surgical navigation system may be found in commonly owned and currently pending U.S. patent Ser. No. 12/336,085, the contents of which are expressly incorporated herein by reference. The surgical navigation system 42 can be used to track the location of a probe or handpiece 44 relative to a patient 48 to assist in a surgical procedure. The probe 44 can have an electromagnetic (EM) instrument tracking device 46 that can receive a signal, transmit a signal, or combinations thereof to provide information to the navigation system 42 to determine a location of the EM instrument tracking device 46. For example, and as discussed herein, the surgical navigation system 42 can be used to track a probe relative to a patient to determine locations of specific anatomical landmarks. A general discussion of the exemplary navigation system 42 is set forth in detail later herein.

The imaging device 40 can be used to acquire pre-, intra-, or post-operative or real-time image data of the patient 48. In one example, the imaging device 40 can be configured to acquire scans of the cranium 10 volumetrically. The sequence of scans can have any suitable thicknesses such as 1, 3 or 5 mm for example. The MRI sequence can be any suitable sequence such as T1, T2, IR, PD, etc. The image data acquired with the imaging device 40 can be used by a workstation 50 as part of an algorithm that can identify various anatomical landmarks of the cranium 10. The workstation 50 can also create a database that includes spatial relationships of various craniometric landmarks of a plurality of patients sorted by a desired population characteristic. The workstation 50 can also be used to reference the image data during an EM image-guided procedure.

The workstation 50 can have a display device 52 to display image data 54 and a user interface 56. The workstation 50 can also include or be connected to an image processor, navigation processor, and a memory to hold instruction and data. The workstation 50 can also include an optimization processor that assists in a navigated procedure.

The workstation 50 facilitates displaying the image data 54 as an image on the display device 52, saving, digitally manipulating, or printing a hard copy image of the received image data. The user interface 56, which may be a keyboard, mouse, touch pen, touch screen, footswitch, speech, or other suitable device, allows a physician or user 60 to provide inputs to control the imaging device 40, or adjust the display settings of the display 52.

Image data can also be acquired using other imaging devices. For example, any 2D, 3D or 4D imaging device, such as isocentric fluoroscopy, bi-plane fluoroscopy, ultrasound, computed tomography (CT), multi-slice computed tomography (MSCT), positron emission tomography (PET), optical coherence tomography (OCT), intra-vascular ultrasound (IVUS), intra-operative CT, and others. Additional imaging systems can include intraoperative MRI systems, such as the PoleStar® MRI system sold by Medtronic, Inc. Image data sets from hybrid modalities, such as positron emission tomography (PET) combined with CT, or single photon emission computer tomography (SPECT) combined with CT, could also provide functional image data superimposed onto anatomical data to be used to confidently reach target sites within the patient 48.

When the system 38 and 42 are used in conjunction with an EM image-guided surgery system, a localizer, such as a coil array 64 and/or second tracking coil array 66, a coil array controller 68, and a navigation handpiece interface 70 can be used with the probe 44. A dynamic reference frame (not specifically shown) can include a dynamic reference frame holder or head frame. Upon driving the coils in the coil array 64 with the coil array controller 68, electromagnetic fields are generated within the patient 48 in the area where the medical procedure is being performed, which is sometimes referred to as patient space. The electromagnetic fields generated in the patient space induce currents in the tracking device 46 positioned on or in the probe 44. Additionally or alternatively, the tracking device can be provided on the head frame. These induced signals from the tracking device 46 are delivered to the navigation handpiece interface 70 and subsequently forwarded to the coil array controller 68. The navigation handpiece interface 70 can also include amplifiers, filters and buffers to directly interface with the tracking device 46 in the probe 44. Additional details regarding surgical navigation may be found in commonly owned and currently pending U.S. patent Ser. No. 11/683,796, which is expressly incorporated herein by reference.

Figure 4:
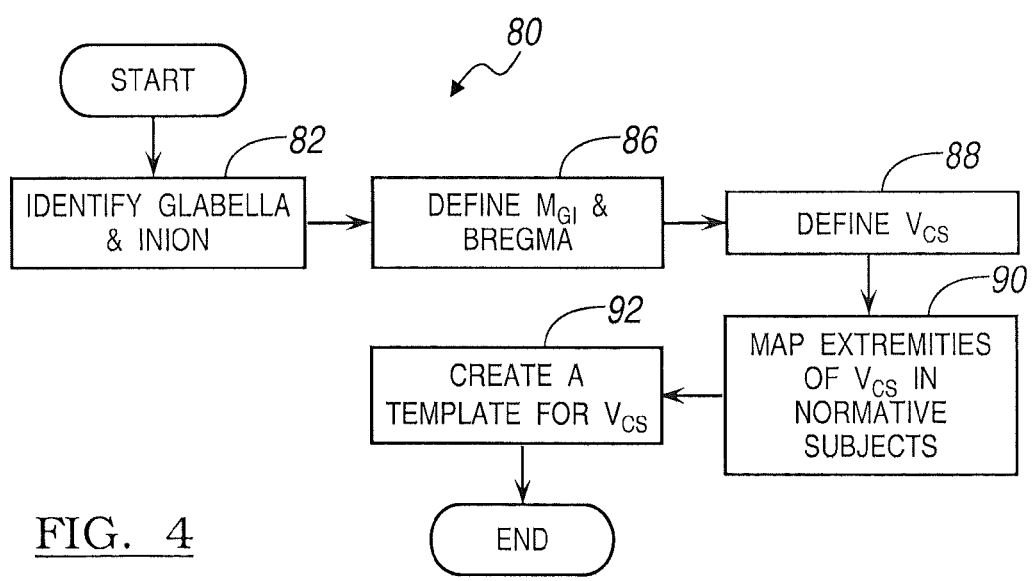
FIG. 4 is a flow chart illustrating exemplary steps for creating a database used for facilitating identification of a coronal suture.
Figure 2:
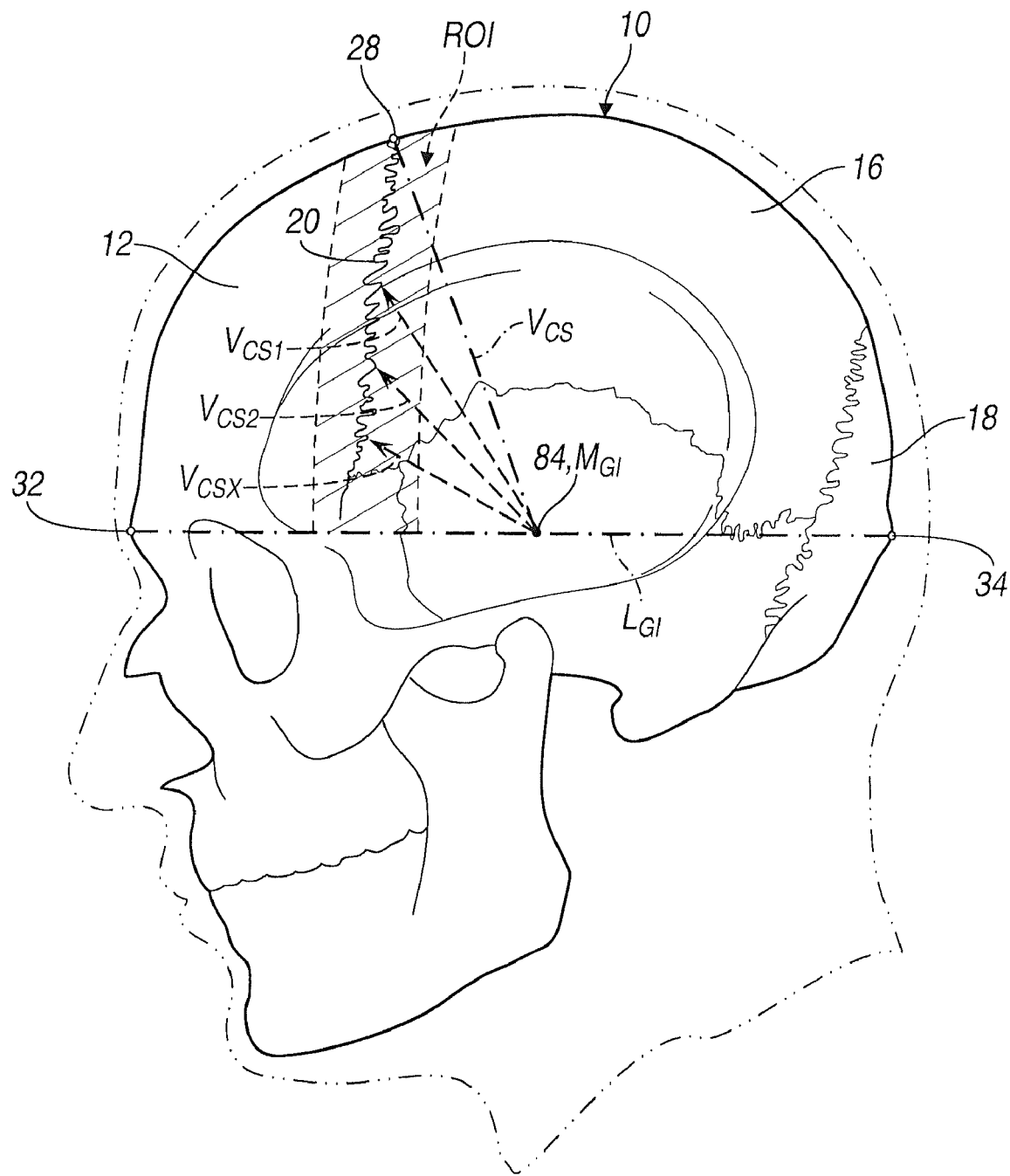
FIG. 2 is a (left) lateral view of the cranium shown in FIG. 1 and illustrated with a line drawn in phantom between a glabella and inion and a vector drawn from a midpoint between the glabella and inion to the bregma according to one example of the present teachings.

With continued reference to FIGS. 1-3 and additional reference to FIG. 4, the system 38 for detecting a location of the coronal suture 20 on a cranium 10 according to one example of the present teachings will be further described. The system 38 can include a processor or processors (such as integral to or separate from the workstation 50) that can execute one or more software or firmware programs. For example, a single processor can perform all the algorithms set forth herein. Alternatively, multiple processors can each be configured to perform or execute an algorithm or algorithms. In one example, the software can execute various algorithms as will be described.

The system 38 can create a learning algorithm for establishing a database for a plurality of patients. The database can include spatial relationships of various craniometric landmarks for the plurality of patients and can be sorted by a desired population characteristic. As will be described, the database can have a plurality of data sets that can be sorted by characteristics, such as ethnicity, age, sex, or other characteristics. As can be appreciated, the relative locations of such craniometric landmarks can vary between patients with respect to such desired characteristics. The database can be built up with a plurality of patients such that the learning algorithm can establish predicted ranges of locations of craniometric landmarks (i.e., such as a coronal suture) for a given population set. As can be appreciated, the more patient data that can be acquired by the database, the more accurate the learning algorithm can establish ranges of predictable locations of the anatomical landmarks. Once the database has been supplied with patient data, the learning algorithm can establish a variance (i.e., min, max, mean) and range of interest (ROI) for searching for the craniometric landmark of interest on a specific patient. The algorithm therefore can limit the search for a given patient to an area within the ROI instead of globally around the cranium.

With reference to FIG. 4, a method 80 for creating the database will now be described. Creation of a database includes acquisition of a plurality of individual data sets or templates from individual patients. For clarity, creation of a data set for one patient will first be described. In block 82, the glabella 32 and the inion 34 are identified on the cranium 10 of a given patient (see FIG. 2). The glabella 32 and inion 34 can be located by any suitable method for example (but not limited to) manual, semi-automatic or fully automatic). In one method, the glabella 32 and inion 34 can be located by semi-automatic identification where the surgeon 60 can propose these points (such as with the probe 44) and the points can be re-validated on the MRI images by software provided in the workstation 50. In another example, a separate algorithm can be provided by the workstation 50 for identification of the glabella 32 and inion 34. The algorithm can search the image data 54 for the most prominent points on the cranium 10 anteriorly (glabella 32) and posteriorly (inion 34).

Once the glabella 32 and inion 34 have been identified, a midpoint $M_{GI}$ 84 (FIG. 2) is defined on a line $L_{GI}$ between the glabella 32 and inion 34 in block 86. The bregma 28 is also located in block 86. The bregma 28 can be located in one example by way of an algorithm in the workstation 50 that searches the image data 54 for an intersection of the sagittal suture 24 and the coronal suture 20 (in the same saggital plane where glabella and inion have been identified). In this regard, the image data 54 in the area of this intersection is generally identifiable as an absence of an MR signal or areas on the image data that appear dark or devoid of image data. In block 88, a vector $V_{CS}$ is defined from the midpoint $M_{GI}$ 84 to the bregma 28. In block 90, the endpoint of the vector $V_{CS}$ is traced from the bregma 28 to the right and left extremities of the coronal suture 20. In one example, the endpoint of the vector $V_{CS}$ can be traced by identifying a plurality of vectors $V_{CS1}$, $V_{CS2}$ ... $V_{CSX}$ from the $M_{GI}$ 84 to corresponding positions along the coronal suture 20. The tips of the plurality of vectors $V_{CS1}$, $V_{CS2}$ ... $V_{CSX}$ can collectively form a serrated curve. The serrated curve traced by the tips of the plurality of vectors $V_{CS1}$, $V_{CS2}$ ... $V_{CSX}$ from the right limit to the left limit identifies the coronal suture 20.

In one example, the algorithm can trace the absence of an MR signal from the image data 54 of the MRI. The absence of the MRI signal can appear as a dark area on the image data 54. In some instances it may be desirable to acquire MRI slices that are thicker (i.e., about 5 mm) for better visualization. In one example, this sequence can be performed using advanced scene analysis (as described in detail by L. Verard, 1997 "Fully Automatic Identification of AC and PC Landmarks On Brain MRI Using Scene Analysis"). In block 92, a template can be generated with definable tolerances for the mid-sagittal plane (corresponding to the midpoint 84), the glabella-inion line $L_{GI}$ and the plurality of vectors $V_{CS1}$, $V_{CS2}$ ... $V_{CSX}$. Distances and angles between the various craniometric landmarks can be built-up into an age/ethnicity/sex/population specific normative template. In other words, the locations of the craniometric landmarks for one patient can be stored or grouped along with relative locations of the same craniometric landmarks of other patients having a common population characteristic. As more patient data is collected, a more robust and inclusive database can be created having multiple groupings of various population characteristics.

Figure 5:
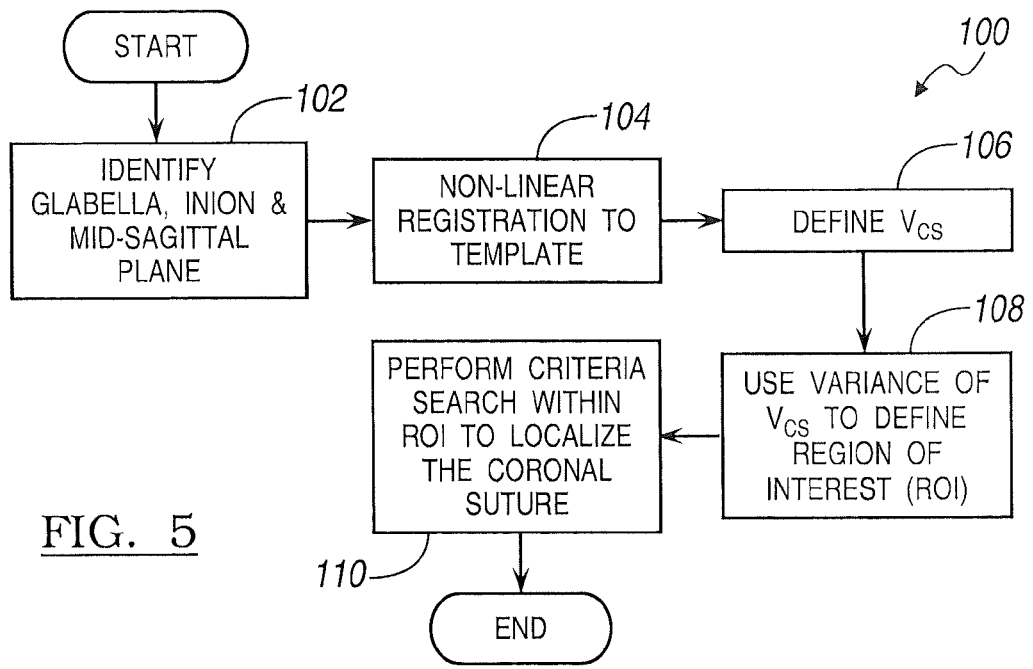
FIG. 5 is a flow chart illustrating exemplary steps for identifying a coronal suture on a patient in a specific subject data set according to the present teachings.
Figure 6:
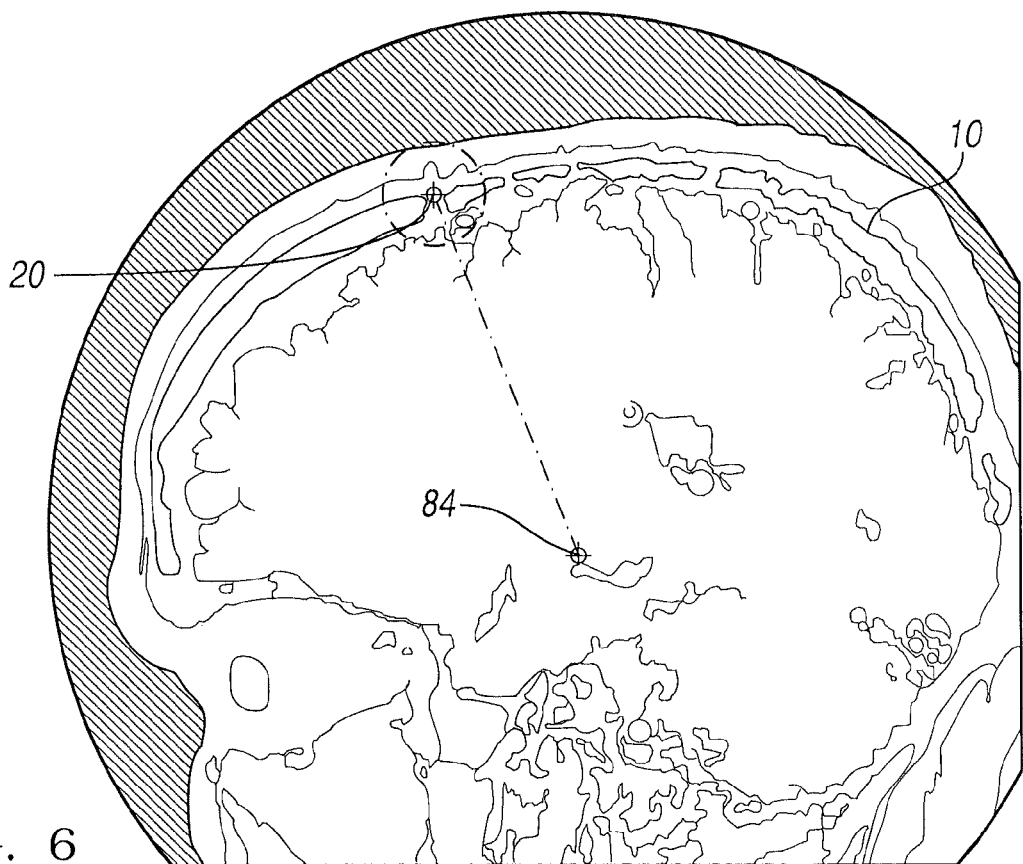
FIG. 6 is an exemplary MRI scan illustrating a coronal suture.

Once the database has been established, identification of a coronal suture 20 for a subsequent patient can be made more efficiently utilizing the database. Turning now to FIGS. 5 and 6, exemplary steps for identifying the coronal suture 20 in a specific subject data set are shown and generally identified at reference numeral 100. The specific subject data set can be limited as desired. For discussion purposes, the specific subject data set can be Asian males between 50 and 60 years old. It is appreciated that the specific subject data set can be defined in any manner and be limited to any or multiple population characteristic or characteristics of interest. In block 102, the location of the glabella 32, inion 34, and midpoint 84 (mid-sagittal plane) are identified as described above. In block 104, the locations of the glabella 32, inion 34, and midpoint 84 of the specific patient are registered to the template created by the database in method 80 described above. In block 106, the vector $V_{CS}$ (and plurality of vectors $V_{CS1}$, $V_{CS2}$ ... $V_{CSX}$) in relation to the midpoint $M_{GI}$ 84 for this specific subject data set is defined as described above. In block 108, the variance (minimum and maximum ranges), for the specific data set (relevant to the Asian males between 50 and 60 years) of the vector $V_{CS}$ (and plurality of vectors $V_{CS1}$, $V_{CS2}$ ... $V_{CSX}$) is then used to define a region of interest (ROI, FIG. 2) for this specific subject data set. In some examples, it may be necessary to detect and remove outlier data points prior to determining the variance. The variance can be established by identifying the range of collective $V_{CS}$ data for Asian males between 50 and 60 years in the specific data set of the database and calculating variability from an average location of the collective $V_{CS}$ data. The ROI can be established by quantifying an area on the cranium 10 having a boundary that encompasses the variance established by the database for the specific subject data set. The ROI can be +/−10% of the variance in the specific data set to include interhuman variability. In block 110, a criteria search is performed (i.e., such as on the image data 54) to locate the absence of an MRI signal within the ROI to precisely localize the coronal suture 20 for the subject patient. The algorithm therefore can limit the criteria search for the coronal suture to a localized area of the cranium 10 within the ROI. Explained further, because the ROI represents a predicted location of a coronal suture as established by the sorted image data according to known population characteristics, the criteria search can be conducted more quickly. In other words, the search area can be limited to an area that encompasses the variance established by the database for the data set of the desired population characteristic (or characteristics). As can be appreciated, by limiting the criteria search to only the ROI, the search is more efficient as compared to searching globally on the cranium 10. Once the coronal suture has been identified on a particular patient, the desired procedure, such as deep brain stimulation can be carried out for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for identifying a coronal suture on a cranium, the method comprising:

acquiring image data of craniums from a plurality of patients;

creating a database that includes spatial relationships of various craniometric landmarks of each patient of the plurality of patients sorted by a desired population characteristic, wherein creating the database for each patient further comprises:

identifying a glabella and an inion on the cranium;

defining a midpoint between the glabella and the inion;

identifying a bregma;

defining a first vector from the midpoint to a bregma of the cranium; and defining a plurality of vectors from the midpoint to the coronal suture between a right and a left extremity of the coronal suture;

establishing a region of interest using a processor based on a variance of locations of the craniometric landmarks between the plurality of patients for the desired characteristic; and performing a criteria search of acquired image data from a specific patient that is limited to only the region of interest to identify a coronal suture for that specific patient.

2. The method of claim 1 wherein the desired population characteristic is selected from the group consisting of ethnicity, age and sex.

3. The method of claim 1 wherein the identification of at least one of the glabella, inion and bregma is determined based on analysis of a plurality of sagittal images.

4. The method of claim 3 wherein the sagittal images are at least one of acquired or reconstructed from one of volumetric, axial, coronal or other image sequences.

5. The method of claim 1 wherein performing the criteria search includes identifying an absence of an MR signal on the acquired image data.

6. A method for identifying a coronal suture on a cranium, the method comprising:

acquiring image data of craniums from a plurality of patients;

creating a database that includes spatial relationships of various craniometric landmarks of the plurality of patients sorted by a desired population characteristic;

establishing a region of interest using a processor based on a variance of locations of the craniometric landmarks between the plurality of patients for the desired characteristic wherein the variance of locations is determined by calculating a variability of coronal suture locations for the plurality of patients in a group or sub-group as described by the desired population characteristic; and performing a criteria search of acquired image data from a specific patient that is limited to only the region of interest to identify a coronal suture for that specific patient wherein performing the criteria search includes identifying an absence of an MR signal on the acquired image data.

7. A system for identifying a coronal suture on a cranium using acquired image data, the system comprising:

a database that establishes spatial relationships of various craniometric landmarks from a plurality of patients based on the image data and sorted by a population characteristic;

a first processor that establishes a region of interest based on a variance of locations of the craniometric landmarks between the plurality of patients for the desired characteristic, wherein the variance of locations is determined by calculating a variability of coronal suture locations for the plurality of patients in a group or sub-group as described by the desired population characteristic; and a second processor that performs a criteria search of acquired image data from a specific patient that is limited to only the region of interest to identify a coronal suture for that specific patient, wherein performing the criteria search includes identifying an absence of an MR signal on the acquired image data.

8. The system of claim 7 wherein the database includes a data set for each patient of the plurality of patients.

9. The system of claim 8 wherein the data set for each patient further comprises an anatomical location for:

a glabella and an inion on the cranium;

a midpoint between the glabella and the inion;

a bregma;

a first vector from the midpoint to a bregma of the cranium; and a plurality of vectors from the midpoint to the coronal suture between a right and a left extremity of the coronal suture.

10. The system of claim 9 wherein each data set comprises anatomical locations of the glabella, inion and bregma and is determined based on analysis of a plurality of sagittal images.

11. The system of claim 10 wherein the sagittal images are at least one of acquired or reconstructed from one of volumetric, axial, coronal or other image sequences.

12. The system of claim 7 wherein the desired population characteristic is selected from the group consisting of ethnicity, age and sex.

13. The system of claim 7, further comprising:

an imaging device that acquires the craniometric image data.

14. The system of claim 7 wherein the first and second processors comprise a single processor.

15. A method for identifying a coronal suture on a cranium, the method comprising:

identifying a glabella and an inion on the cranium;

defining a midpoint between the glabella and the inion;

identifying a bregma;

defining a first vector from the midpoint to the bregma of the cranium; and identifying the coronal suture using a processor, and including defining a plurality of vectors from the midpoint to the coronal suture between a right and a left extremity of the coronal suture.

16. The method of claim 15 wherein the identification of at least one of the glabella, inion and bregma is determined based on analysis of a plurality of sagittal images.

17. The method of claim 16 wherein the sagittal images are at least one of acquired or reconstructed from one of volumetric, axial, coronal or other image sequences.

18. The method of claim 15 wherein identification of the glabella, inion and bregma includes analysis of image data acquired from an MRI.

19. The method of claim 18 wherein analysis of the image data comprises identifying an absence of an MR signal on the acquired image data.

20. The method of claim 19, further comprising:

performing a surgical procedure based on the identified coronal suture.

21. The method of claim 20 wherein performing the surgical procedure includes performing deep brain stimulation.

* * * * *